No. 690,948. Patented Jan. 14, 1902.
W. HARSTICK.
REPLANTING ATTACHMENT FOR CULTIVATORS OR PLOWS.
(Application filed Nov. 6, 1901.)
(No Model.)
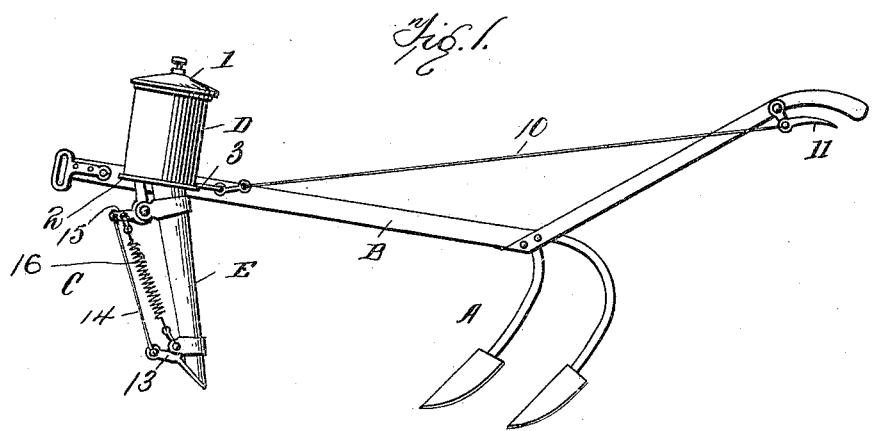
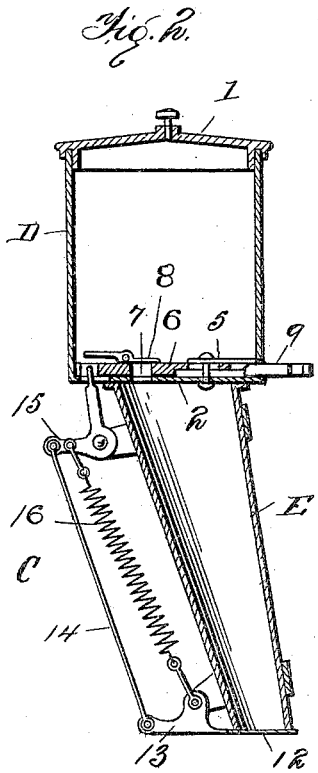
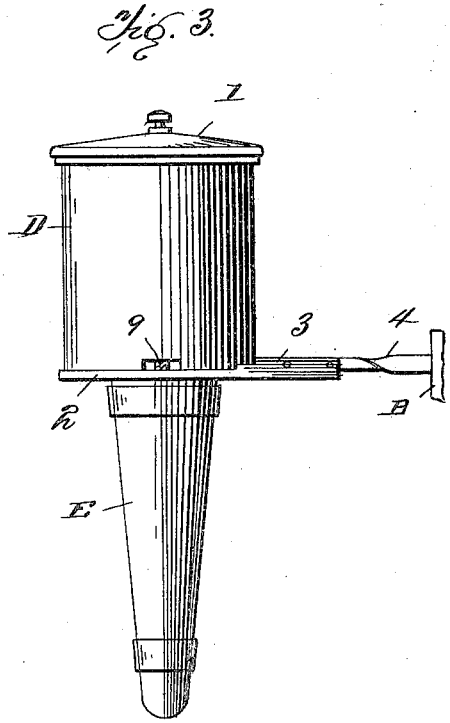
Witnesses
George Wakefield
Ada Virginia Bates
Inventor
William Harstick
By Wm. H. Bates
Attorney

UNITED STATES PATENT OFFICE.

WILLIAM HARSTICK, OF HANOVER, ILLINOIS.

REPLANTING ATTACHMENT FOR CULTIVATORS OR PLOWS.

SPECIFICATION forming part of Letters Patent No. 690,948, dated January 14, 1902.

Application filed November 6, 1901. Serial No. 81,327. (No model.)

*To all whom it may concern:*

Be it known that I, WILLIAM HARSTICK, a citizen of the United States, residing at Hanover, in the county of Jo Daviess and State of Illinois, have invented certain new and useful Improvements in Replanting Attachments for Cultivators or Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to seed planters or droppers adapted to be affixed and secured to the beam of a corn-plow or other similar implement, and is especially intended for use in replanting corn and other seeds or cereals at the first plowing or cultivation in instances where the hills or deposits have been deprived or depleted of the requisite number of shoots, sprouts, or plants.

The object of the invention is to provide a device or mechanism for planting and replanting corn and other hilled cereals and products, and this I propose to accomplish by securing to the forward end of the plow-beam a planting device or mechanism which is readily and conveniently actuated and operated from the handle of the plow.

In the drawings accompanying, Figure 1 is a side elevation showing the device attached to a plow or cultivator beam. Fig. 2 is a vertical central section through the complete device removed from the plow-beam, and Fig. 3 is a front view of the device removed from the plow-beam.

Referring to the drawings, A designates a corn-plow of any desired and proper construction and build; and B is the plow-beam, on which at the desired point or place it is designed to secure the seed planter or dropper.

C designates the planter or dropper generally, of which D is the seed receptacle and holder, made of the desired size and capacity, having a removable cover or lid 1 and a metal bottom 2, formed with a laterally-extended arm 3, adapted to be secured to a support 4 by fastening-screws, the support or arm 4 being in turn fastened to the beam of the plow by any suitable fastenings. In the bottom of the seed-holder are formed flanges 5 5, parallel to each other and between which it is proposed to slidingly arrange a seed-dropping slide or bar 6, provided with a seed-hole 7, which normally lies under a plate-cover or cut-off 8 at the forward end of the seed-slide. The end of the seed-slide projects out from the seed-holder, as at 9, and is suitably connected to a pull-bar 10, having its other end connected to a short hand-lever 11, mounted on the hand-grasp or handle of the plow.

E designates the seed spout or chute, having its upper end secured to the bottom of the seed-holder and having its lower end closed by a pivotally supported or hinged closure 12, formed with an arm 13, the outer end of which is pivotally connected to the lower end of a pitman bar or rod 14, having its upper end connected to the lateral extended arm 15 of an elbow-lever, which is pivotally secured to the seed-spout, the other arm of the elbow-lever being secured to the inner end of the seed-slide, as shown in the drawings. The lower arm of the elbow-lever has secured thereto the upper end of a suitable retractile spring 16, the lower end of which spring is anchored to the lower end of the seed-spout, as indicated in the drawings.

It will be perceived that my invention contemplates the manipulation and operation of the device from the handle of the plow and that it is capable of depositing the seed at any point it may be desired or required.

My invention is convenient to operate, simple in its operation, durable in its construction, and cheap to manufacture.

Having thus described my invention, what I claim as new, and desire to secure by Letters Patent, is—

In a replanting attachment for plows or cultivators, the combination with the seed-receptacle of the adjustable seed-slide constructed as described, a chute secured to the under side of the receptacle, and a seed-slide-operating mechanism secured to the chute consisting of a bell-crank lever, spring, pitman-bar, and chute-closure, all arranged for joint operation, substantially as described.

In testimony whereof I affix my signature in presence of two witnesses.

WILLIAM HARSTICK.

Witnesses:
  BENJ. EADIE,
  RETTA A. MOORE.